United States Patent
Rieger

(12) 
(10) Patent No.: US 6,631,782 B1
(45) Date of Patent: Oct. 14, 2003

(54) ELECTRICALLY ASSISTED POWER STEERING SYSTEM FOR MOTOR VEHICLES

(75) Inventor: Wolfgang Rieger, Donzdorf (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 09/720,009

(22) PCT Filed: Jun. 12, 1999

(86) PCT No.: PCT/EP99/04072
§ 371 (c)(1), (2), (4) Date: Dec. 19, 2000

(87) PCT Pub. No.: WO00/13957
PCT Pub. Date: Mar. 16, 2000

(30) Foreign Application Priority Data

Jun. 19, 1998 (DE) .................................. 198 27 344

(51) Int. Cl.$^7$ .................................................. B62D 5/04
(52) U.S. Cl. ..................... 180/446; 180/443; 701/41
(58) Field of Search ................ 180/446, 443, 180/6.2, 6.24, 6.28; 701/41

(56) References Cited

U.S. PATENT DOCUMENTS

| | | | | |
|---|---|---|---|---|
| 4,926,960 A | * | 5/1990 | Ishikura et al. | 180/446 |
| 5,184,297 A | * | 2/1993 | Graber et al. | 364/424.05 |
| 5,253,728 A | * | 10/1993 | Matsuno et al. | 180/140 |
| 5,307,892 A | * | 5/1994 | Phillips | 180/422 |
| 5,717,590 A | * | 2/1998 | Mihalko | 364/424.051 |
| 5,719,766 A | * | 2/1998 | Bolourchi et al. | 364/424.052 |
| 5,937,965 A | * | 8/1999 | Takagi et al. | 180/422 |
| 5,992,558 A | * | 11/1999 | Noro et al. | 180/446 |
| 6,015,023 A | * | 1/2000 | Mukai et al. | 180/446 |
| 6,116,372 A | * | 9/2000 | Mukai et al. | 180/446 |
| 6,131,693 A | * | 10/2000 | Mukai et al. | 180/446 |
| 6,152,255 A | * | 11/2000 | Noro et al. | 180/446 |

FOREIGN PATENT DOCUMENTS

| | | |
|---|---|---|
| DE | 33 43 180 | 6/1984 |
| DE | 39 22 527 | 1/1991 |
| DE | 41 34 850 | 4/1992 |
| DE | 41 12 738 | 10/1992 |
| DE | 44 07 729 | 9/1994 |
| DE | 196 50 691 | 6/1998 |
| DE | 196 51 968 | 6/1998 |
| EP | 0 109 085 | 5/1984 |
| EP | 0 308 259 | 3/1989 |
| EP | 0 407 716 | 1/1991 |
| EP | 0 788 964 | 8/1997 |
| EP | 0 872 395 | 10/1998 |
| JP | 09 113524 | 5/1997 |

* cited by examiner

Primary Examiner—Lesley D. Morris
Assistant Examiner—Daniel Yeagley
(74) Attorney, Agent, or Firm—Kenyon & Kenyon

(57) ABSTRACT

An electrically assisted power steering system for motor vehicles includes an input shaft (2) that is in working engagement with a steering wheel (4). The input shaft (2) is used to transfer a torque necessary for steering wheels that are to be steered. An output member is in working engagement with the wheels to be steered. An electric motor (7), by way of which a power assist may be exerted on the input shaft (2) or the output member, is arranged on the power steering system. A detection unit (10) is provided to ascertain the parameters for the equipment variant of the vehicle present in each case. The ascertained parameters are conveyed to the electronics unit (9) for adapted control of the electric motor (7). The parameters for the equipment variant of the vehicle present in each case include values for the specific front axle load of the vehicle and/or for the tire characteristic of the vehicle.

5 Claims, 1 Drawing Sheet

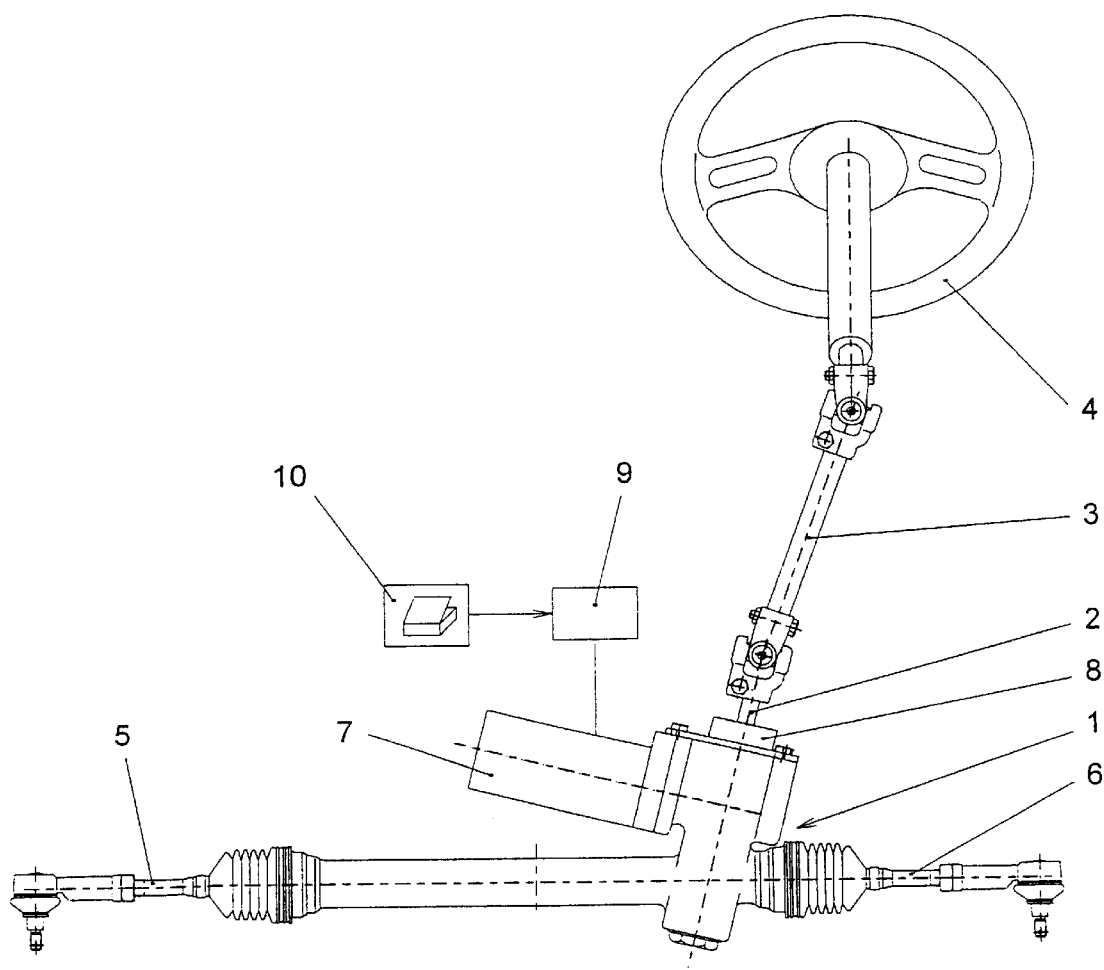

ELECTRICALLY ASSISTED POWER STEERING SYSTEM FOR MOTOR VEHICLES

FIELD OF THE INVENTION

The present invention relates to an electrically assisted power steering system for motor vehicles. The power steering system contains an input shaft that is in working engagement with a steering wheel and that is used to transfer a torque necessary for steering wheels that are to be steered. An output member is in working engagement with the wheels to be steered. An electric motor, with which a power assist is exerted on the input shaft or the output member, is arranged on the power steering system. A sensing unit is used to sense the direction and intensity of a steering torque acting on the input shaft, and other steering-specific parameters. An electronics unit is used to process the steering-specific parameters and to control the electric motor.

BACKGROUND INFORMATION

An electrically assisted power steering system is described, for example, in German Published Patent Application No. 44 07 729. In this power steering system, an electric motor is controlled by an electronic control unit as a function of a torque.

Conventional hydraulic or electrohydraulic steering systems are matched to each individual vehicle version with the aid of the valve characteristic. The profile of this valve characteristic plays a substantial part, in conjunction with the chassis concept, axle kinematics, suspension kinematics, and the design of the chassis components (e.g., spring and shock absorber characteristics), in determining the steering and driving behavior of the vehicle.

An ideal valve characteristic curve, called the "nominal characteristic curve," is therefore defined jointly by the vehicle manufacturer and steering system manufacturer during the development phase of each vehicle.

Valve components of conventional hydraulic and electrohydraulic steering systems cannot, however, be produced without tolerances. One is therefore forced to accept, in such systems, a production error band for the valve characteristic curve (the "tolerance band") that is usually arranged symmetrically about the "nominal" characteristic curve.

Vehicle manufacturers offer a wide range of different equipment variants for a vehicle model. These include, for example, different engine choices, which usually result in considerably different front axle loads. These differing front axle loads would ideally need to result in different nominal steering characteristic curves. For reasons of excessive cost and the large number of variations, however, this is usually not done.

A further influence on the profile of the nominal characteristic curve of a power steering system derives from the tire characteristic of the vehicle. Normally, however, the valve characteristic curve is coordinate only with an average tire characteristic of a current tire type.

If the original tire is replaced, for example in the context of a replacement purchase, with a tire having a different characteristic, the steering characteristics can thereby be considerably changed. The driver will then perceive the steering behavior to be unsatisfactory.

SUMMARY

It is therefore an object of the present invention to improve an electrically assisted power steering system so that satisfactory steering characteristics are always achieved with different equipment variants of a vehicle.

The above and other beneficial objects of the present invention are achieved by providing an electrically assisted power steering systems as described and claimed herein. This object is achieved in particular in that in a power steering system, a detection unit is provided to ascertain the parameters for the equipment variant of the vehicle present in each case, and that the ascertained parameters are conveyed to the electronics unit for adapted control of the electric motor.

If the parameters for the equipment variant of the vehicle present in each case contain values for the specific front axle load of the vehicle, the steering characteristic can then be adapted to different vehicle engines.

In addition or as an alternative to the parameters for the specific front axle load of the vehicle, the parameters for the equipment variant of the vehicle present in each case can contain values for the tire characteristic of the vehicle. Different tire types and sizes can thereby be taken into account in defining the steering characteristic. The values for the tire characteristic may, in this context, contain information concerning tire slip stiffness and/or force/deformation behavior and/or parameters for specific tire types.

The parameters for the equipment variant of the vehicle present in each case may be read into the detection unit, for example, in accordance with a barcode identifier. Advantageously, the detection unit is integrated at the vehicle manufacturer's premises into an end-of-line computer (assembly line programming unit), into service location shop testers, or, in special cases, into the electronics unit.

Multiple steering characteristics may be stored in the electronics unit. The particular characteristic that is appropriate may be activated in accordance with the parameters for the equipment variant of the vehicle present in each case.

BRIEF DESCRIPTION OF THE DRAWING

FIG.1 shows schematically an electrically assisted power steering system according to the present invention.

In the exemplary embodiment illustrated in FIG. 1, the electrically assisted power steering system contains a steering gear in the form of a rack-and-pinion steering system 1. The rack-and-pinion steering system is conventionally known, and will therefore not be described further. A pinion (not depicted) of the rack-and-pinion steering system carries an input shaft 2 that, for example, by way of a steering column 3 equipped with universal joints, is in working engagement with a steering wheel 4. A different steering gear, for example, a recirculating-ball steering system, may also be used instead of a rack-and-pinion steering system.

A toothed rack (not depicted) of rack-and-pinion steering system 1 forms, together with two steering drag links 5 and 6, an output member that is in working engagement with wheels (not depicted) that are to be steered. The toothed rack constitutes the output element of the steering system.

With a power steering system of this kind, a steering torque may be transferred from steering wheel 4 to the wheels that are to be steered.

A power assist may be exerted onto input shaft 2 by an electric motor 7. In the exemplary embodiment shown in FIG. 1, electric motor 7 is arranged so that its axis is perpendicular to the axis of input shaft 2 and thus to the axis of the pinion. Its axis may also be at a different angle to the axis of the input shaft, for example, at an angle of from 60° to 130°.

With the same or similar effect, electric motor 7 may be arranged so that its axis is arranged parallel to the axis of input shaft 2 and thus to the axis of the pinion or another part of steering column 3.

In the two types of arrangement of electric motor 7 described above, the latter acts on input shaft 2 and on the pinion of rack-and-pinion steering system 1. Electric motor 7 may also be arranged so that its axis runs parallel or at an angle to, or coaxially with, the axis of the toothed rack of rack-and-pinion steering system 1.

A sensing unit 8 is used to sense the direction and intensity of a steering torque acting on input shaft 2 and other steering-specific parameters. In the exemplary embodiment, sensing unit 8 is arranged on input shaft 2. Sensor unit 8 may also, however, be provided elsewhere in the steering system.

An electronics unit 9 is used to process the steering-specific parameters and to control electric motor 7.

According to the present invention, a detection unit 10 is provided, serving to ascertain the parameters for the equipment variant of the vehicle present in each case. These ascertained parameters are conveyed to electronics unit 9 for adapted control of electric motor 7. The steering characteristic curve can thereby be adapted to the corresponding vehicle equipment variant. It is possible in this fashion, solely by way of the control algorithm established in the software of electronics unit 9, to generate a steering characteristic profile that corresponds exactly to the "nominal" characteristic curve. In contrast to conventional hydraulic steering systems, it is not necessary in this case to account for any production error band for the identifier.

Advantageously, the parameters for the equipment variant of the vehicle present in each case include values for the specific front axle load of the vehicle, by way of which, for example, different engine variants may be taken into consideration.

In order to take into account different tire types that may be mounted on one particular vehicle during the course of the vehicle's service life, the values for the tire characteristic are sensed. These values may include, for example, information relating to tire slip stiffness, force/deformation behavior, and/or parameters for specific tire types. In this context, several different tire versions, the most important driving characteristics of which are comparable may be combined into characteristics groups.

The parameters for the equipment variant of the vehicle present in each case may be read into the detection unit, for example, in accordance with a barcode identifier. In this context, for example, different barcode identifiers are associated with different engine variants or tire types.

Detection unit 10 may be integrated, at the vehicle manufacturer's premises, into an end-of-line computer (assembly line programming unit), into service location shop testers, or, in special cases, into electronics unit 9. The parameters can then be read into electronics unit 9 via a vehicle interface provided for that purpose.

Multiple steering characteristics may be read into electronics unit 9. The particular characteristic that is appropriate, may be activated in accordance with the parameters for the equipment variant of the vehicle present in each case.

The embodiments according to the present invention ensure that a steering characteristic of a vehicle that is ideally coordinated by experts of the vehicle and steering system manufacturing companies is consistently maintained during the vehicle's service life even if chassis characteristics should change (for example due to the replacement of tires, shock absorbers, etc.).

What is claimed is:

1. An electrically assisted power steering system for a motor vehicle, comprising:

an input shaft in engagement with a steering wheel of the motor vehicle;

an output member in engagement with wheels of the motor vehicle to be steered;

an electric motor configured to transmit a power assist on one of the input shaft and the output member;

a sensing unit configured to sense at least one steering-specific parameter, the at least one steering-specific parameter including a direction and intensity of a steering torque imparted on the input shaft;

an electronics unit configured to process the at least one steering-specific parameter and to control the electric motor; and a detection unit configured to determine at least one parameter relating to a steering characteristic of an equipment variant present in the motor vehicle and to transmit the determined at least one parameter to the electronics unit, the electronics unit configured to control the electric motor in accordance with the determined at least one parameter relating to the steering characteristic of the equipment variant present in the motor vehicle;

wherein the at least one parameter relating to the steering characteristic of the equipment variant present in the motor vehicle includes a parameter representing at least one tire characteristic of the motor vehicle; and wherein a plurality of tire versions are combined to define at least one characteristic group in accordance with the at least one tire characteristic.

2. The electrically assisted power steering system according to claim 1, wherein the at least one parameter relating to the steering characteristic of the predetermined equipment variant present in the motor vehicle includes at least one of a parameter representing a front axle load of the vehicle and parameters representing respective chassis springs associated with different front axle loads.

3. The electrically assisted power steering system according to claim 1, wherein the at least one tire characteristic includes at least one of a tire slip stiffness, a force/deformation behavior and a tire type.

4. The electrically assisted power steering system according to claim 1, wherein the detection unit is configured to determine the at least one parameter relating to the steering characteristic of the predetermined equipment variant present in the motor vehicle in accordance with a barcode identifier.

5. The electrically assisted power steering system according to claim 1, wherein the electronics unit includes a vehicle interface, the vehicle interface being configured to connect with the detection unit, the detection unit external to the motor vehicle.

* * * * *

UNITED STATES PATENT AND TRADEMARK OFFICE
CERTIFICATE OF CORRECTION

PATENT NO.   : 6,631,782 B1
DATED        : October 14, 2003
INVENTOR(S)  : Rieger It is certified that error appears in the above-identified patent and that said Letters Patent is hereby corrected as shown below:

Title page,
Item [57], ABSTRACT,
Line 2, delete "(2)";
Line 3, delete "(4)" and delete "(2)";
Line 6, delete "(7)";
Line 8, delete "(2)";
Line 9, delete "(10)";
Line 12, delete "(9)"; and
Line 13, delete "(7)".

Signed and Sealed this

Seventh Day of March, 2006

JON W. DUDAS
*Director of the United States Patent and Trademark Office*